United States Patent
Chuang

(10) Patent No.: US 9,698,718 B2
(45) Date of Patent: Jul. 4, 2017

(54) MOTOR SPEED CONTROL SYSTEM AND METHOD THEREOF

(71) Applicant: HANKING POWER TECHNOLOGY CO., LTD., Changhua County (TW)

(72) Inventor: Tzu-Nan Chuang, Changhua County (TW)

(73) Assignee: HANKING POWER TECHNOLOGY CO., LTD., Changhua County (TW)

(*) Notice: Subject to any disclaimer, the term of this patent is extended or adjusted under 35 U.S.C. 154(b) by 0 days.

(21) Appl. No.: 14/620,207

(22) Filed: Feb. 12, 2015

(65) Prior Publication Data

US 2015/0244300 A1  Aug. 27, 2015

(30) Foreign Application Priority Data

Feb. 21, 2014 (TW) .............................. 103203039 U
Jan. 9, 2015 (TW) .............................. 104100775 A

(51) Int. Cl.
*F16H 48/06* (2006.01)
*H02P 1/00* (2006.01)
*H02P 25/02* (2016.01)
*H02P 6/08* (2016.01)
*H02K 16/00* (2006.01)
*H02P 25/22* (2006.01)

(52) U.S. Cl.
CPC ............. *H02P 25/02* (2013.01); *H02K 16/00* (2013.01); *H02P 6/08* (2013.01); *H02P 25/22* (2013.01)

(58) Field of Classification Search
CPC ................................................... B23B 45/008
USPC .............. 310/156.36, 216; 318/519; 409/230
See application file for complete search history.

(56) References Cited

U.S. PATENT DOCUMENTS

| 4,683,411 A | 7/1987 | Hamilton, Jr. et al. |
| 5,502,368 A * | 3/1996 | Syverson .............. H02J 7/1438 310/181 |
| 5,760,556 A | 6/1998 | Hamilton, Jr. et al. |
| 2003/0072630 A1* | 4/2003 | Kato .................... B23Q 1/0009 409/230 |

(Continued)

FOREIGN PATENT DOCUMENTS

| CN | 103490682 A | 1/2014 |
| TW | M372036 U | 1/2010 |

(Continued)

*Primary Examiner* — Eduardo Colon Santana
*Assistant Examiner* — Cortez Cook
(74) *Attorney, Agent, or Firm* — CKC & Partners Co., Ltd.

(57) ABSTRACT

A motor speed control system includes a motor, a control module and a displaying module. The motor includes a rotor and a stator. The rotor includes at least one induction rotor portion. The stator includes at least one induction stator portion. The induction rotor portion is corresponding to the induction stator portion. The control module is electrically connected to the rotor and the stator. The control module controls an induction rotor current of the induction rotor portion and an induction stator current of the induction stator portion to produce a rotor speed. The control module decreases or turns off the induction rotor current to keep the rotor speed at a predetermined value according to a rotational inertia of the rotor and the induction stator current when the rotor speed reaches the predetermined value. The displaying module displays the rotor speed and variable currents.

6 Claims, 7 Drawing Sheets

(56) References Cited

U.S. PATENT DOCUMENTS

| | | | |
|---|---|---|---|
| 2005/0275303 A1 | 12/2005 | Tetmeyer | |
| 2006/0290219 A1* | 12/2006 | Rodger | H02K 21/46 310/156.36 |
| 2009/0098971 A1* | 4/2009 | Ho | B23B 45/008 475/153 |
| 2011/0181226 A1* | 7/2011 | Steiner | H02P 13/06 318/519 |
| 2011/0316468 A1 | 12/2011 | Makki et al. | |

FOREIGN PATENT DOCUMENTS

| | | |
|---|---|---|
| TW | I375395 B | 10/2012 |
| WO | 2004079889 A1 | 9/2004 |

\* cited by examiner

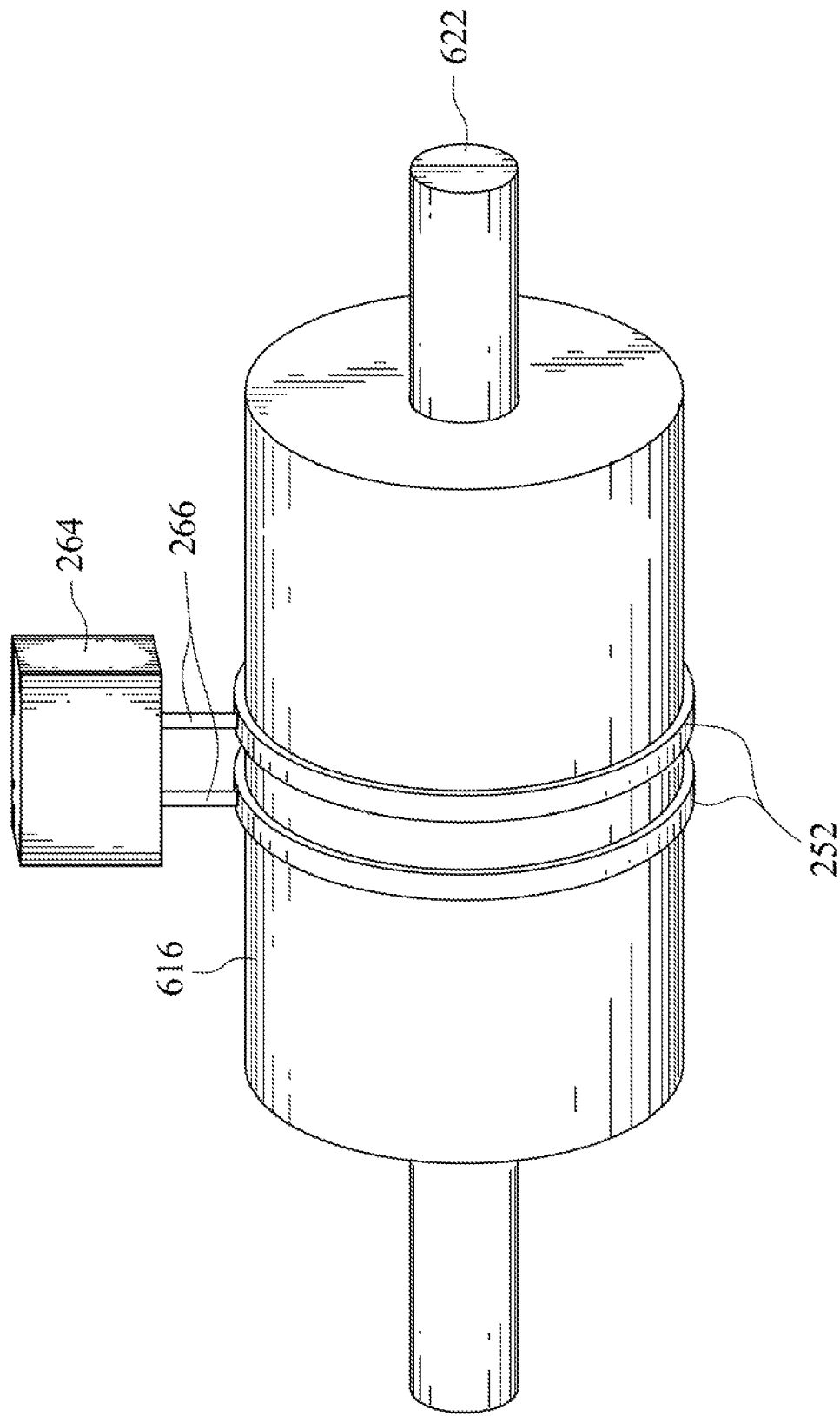

MOTOR SPEED CONTROL SYSTEM AND METHOD THEREOF

RELATED APPLICATIONS

This application claims priority to Taiwan Application Serial Number 103203039 filed Feb. 21, 2014 and Taiwan Application Serial Number 104100775, filed Jan. 9, 2015, which are herein incorporated by reference.

BACKGROUND

Technical Field

The present disclosure relates to a motor speed control system and a motor speed control method. More particularly, the motor speed control system and the motor speed control method of the present disclosure are capable of reducing magnetic force of a rotor and increasing motor operation efficiency.

Description of Related Art

In many industrials, operations of machines require a rotational movement. A motor is commonly used to produce this kind of rotational movement. The motor has become an indispensable device owing to its capability on converting magnetic energy or electrical energy into mechanical energy. There are various types of motors that can be applicable to different environments and operation conditions, such as induction motors and permanent magnet motors.

The conventional permanent magnet motor includes a stator, a rotor and a shell. The stator is composed of an armature coil and an armature core. The armature core is formed by stacking a plurality of silicon steel sheet, and the armature is located on the stator. The rotor is made of permanent magnetic material. The shell not only can fix the stator, but also can be used as a part of the magnetic circuit. Furthermore, inner-rotor permanent magnet motors can be classified into different types according to the types that the stator winds, such as two-phase, three-phase or five-phase permanent magnet motor, and the three-phase permanent magnet motor is the most popular. In general, the permanent magnet motor has high operation efficiency. In the permanent magnet motor, a torque is generated from interaction between the permanent magnet of the rotor and the stator coils to keep the synchronous speed. Recently, due to the constantly improved material of the permanent magnet and magnetic energy product, the permanent magnet motor can achieve very high operation efficiency.

However, the permanent magnet motor has the characteristics of slow starting time, and has insufficient torque at low speed, therefore its rotational speed takes a long time to reach a predetermined value. Furthermore, a complicated control system is required in the permanent magnet motor, thus the manufacturing cost of the motor is increased. Moreover, when the permanent magnet motor reaches the highest rotor speed, the power consumption of the motor is too large. Therefore, a motor speed control system and method having low cost, simple control, high-energy efficiency and high torque with maximum rotor speed is commercially desirable.

SUMMARY

According to one aspect of the present disclosure a motor speed control system includes a motor, a control module and a displaying module. The motor includes a rotor and a stator. The stator is coaxially and pivotally connected to the rotor. The rotor includes at least one induction rotor portion and at least one permanent magnet rotor portion. The stator includes at least one induction stator portion and at least one permanent magnet stator portion. The induction rotor portion is corresponding to the induction stator portion. The induction rotor portion and the induction stator portion are separated by an induction distance. The permanent magnet rotor portion is corresponding to the permanent magnet stator portion. The permanent magnet rotor portion and the permanent magnet stator portion are separated by a permanent magnet distance. The control module is electrically connected to the rotor and the stator. The control module controls an induction rotor current of the induction rotor portion, an induction stator current of the induction stator portion and a permanent magnet stator current of the permanent magnet stator portion to produce a rotor speed. The control module decreases or turns off the induction rotor current to keep the rotor speed at a predetermined value according to a rotational inertia of the rotor and the induction stator current when the rotor speed reaches the predetermined value. The displaying module is electrically connected to the control module. The displaying module displays the rotor speed, the induction rotor current and the permanent magnet stator current.

According to another aspect of the present disclosure, a motor speed control method for using the motor speed control system includes a first control step, a second control step, a third control step and a displaying, step. The first control step is for controlling the induction rotor current and the induction stator current to change the rotor speed by the control module when the rotor speed is less than the predetermined value. The second control step is for decreasing or turning off the induction rotor current by the control module when the rotor speed reaches the predetermined value, and the rotor speed is kept at the predetermined value according to the rotational inertia of the rotor and the induction stator current. The third control step is for controlling the permanent magnet stator current to increase the rotor speed by the control module when the rotor speed reaches the predetermined value. The displaying step is for displaying the rotor speed, the induction rotor current and the permanent magnet stator current by the displaying module.

According to further another aspect of the present disclosure, a motor speed control system includes a motor, a control module and a displaying module. The motor includes a rotor and a stator. The rotor includes at least one induction rotor portion. The stator includes at least one induction stator portion. The stator is coaxially and pivotally connected to the rotor. The induction rotor portion is corresponding to the induction stator portion. The induction rotor portion and the induction stator portion are separated by an induction distance. The control module is electrically connected to the rotor and the stator. The control module controls an induction rotor current of the induction rotor portion and an induction stator current of the induction stator portion to produce a rotor speed. The control module decreases or turns off the induction rotor current to keep the rotor speed at a predetermined value according to a rotational inertia of the rotor and the induction stator current when the rotor speed reaches the predetermined value. The displaying module is electrically connected to the control module. The displaying module displays the rotor speed and the induction rotor current.

BRIEF DESCRIPTION OF THE DRAWINGS

The invention can be more fully understood by reading the following detailed description of the embodiment, with reference made to the accompanying drawings as follows:

FIG. 4B is a schematic view of the slip rings according to another embodiment of the present disclosure.

DETAILED DESCRIPTION

Figure 1:
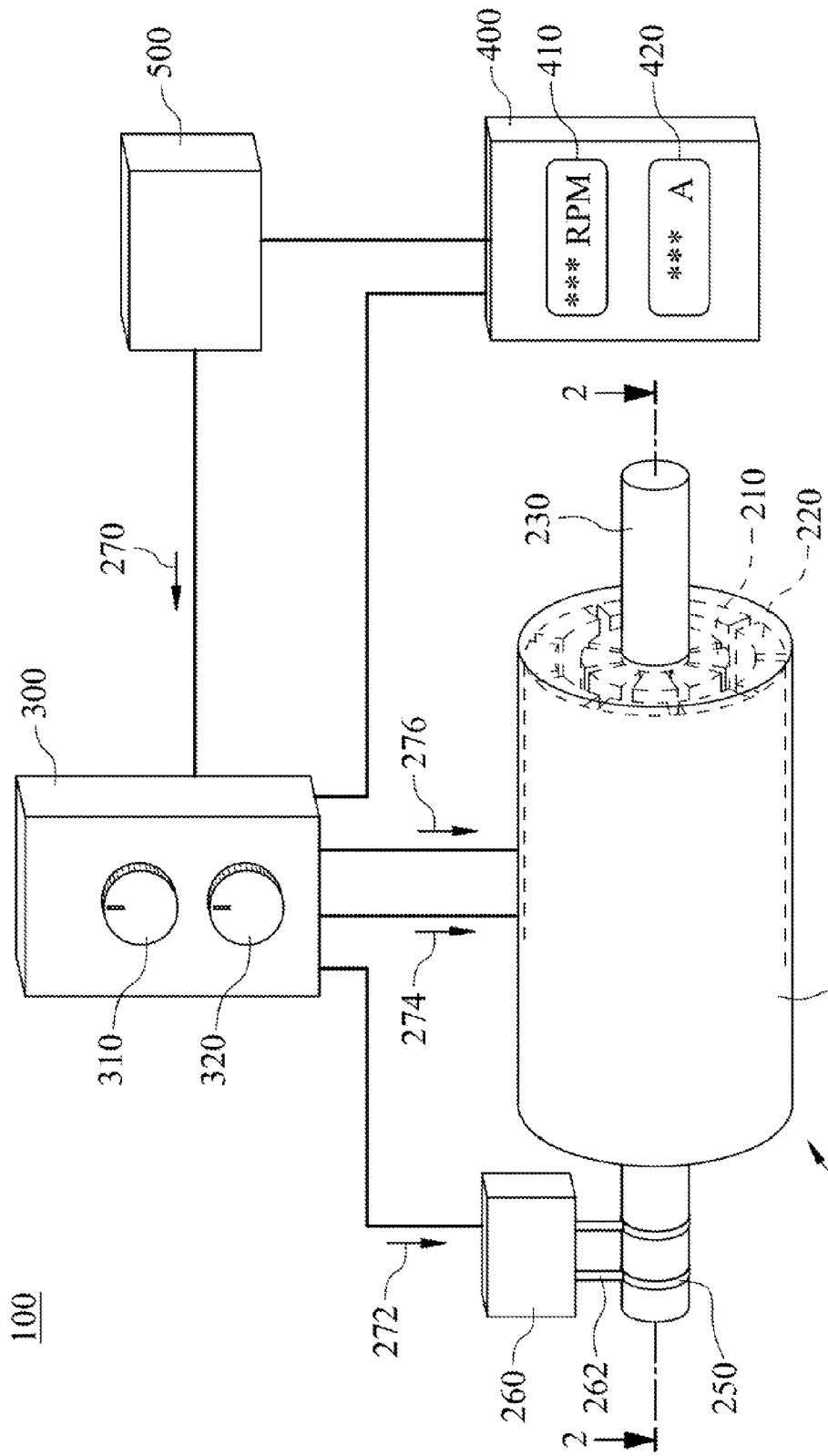
FIG. 1 is a schematic view of a motor speed control system according to one embodiment of the present disclosure.
Figure 2:
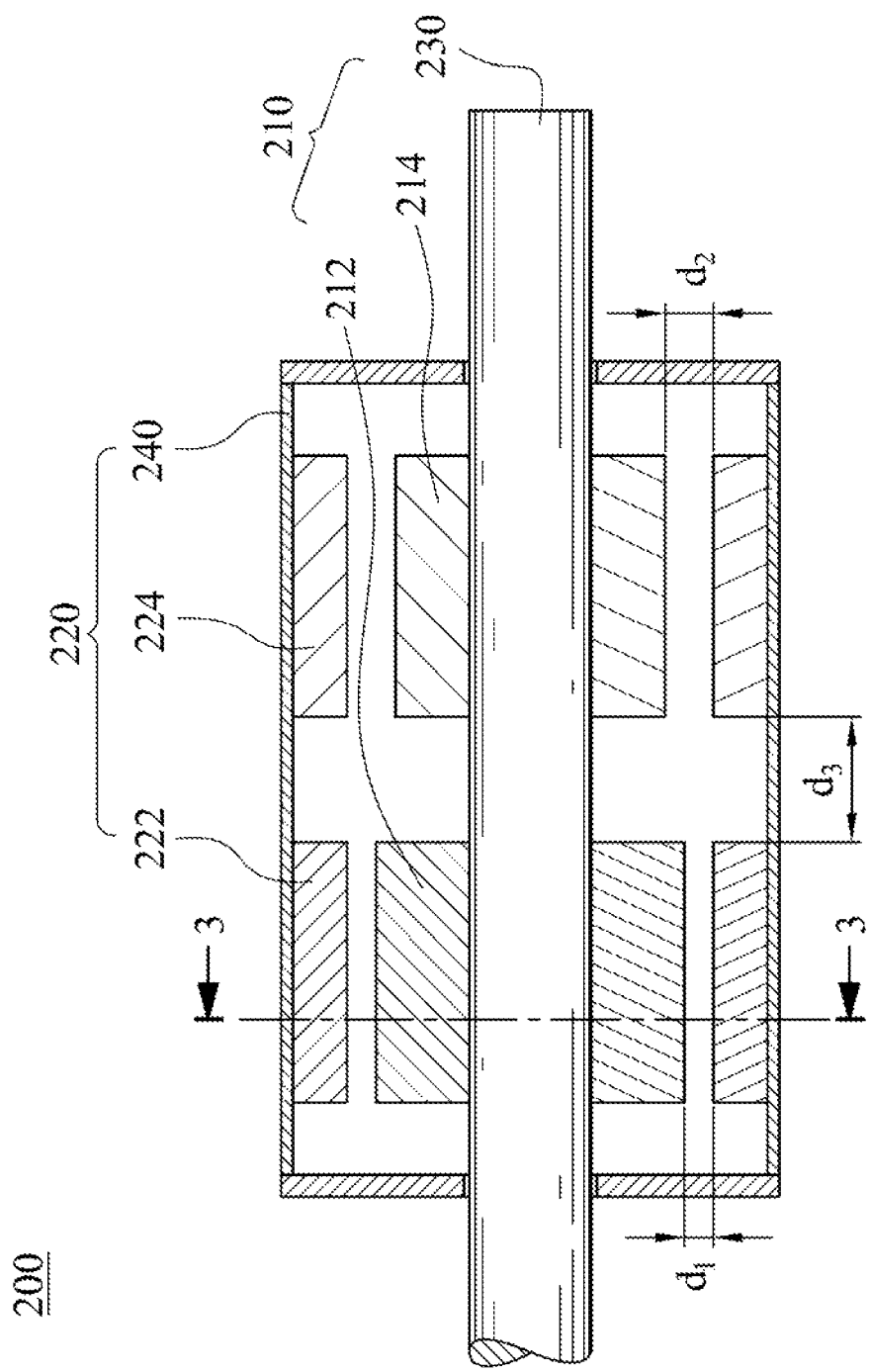
FIG. 2 is a cross-sectional vie of the motor of FIG. 1.
Figure 3A:
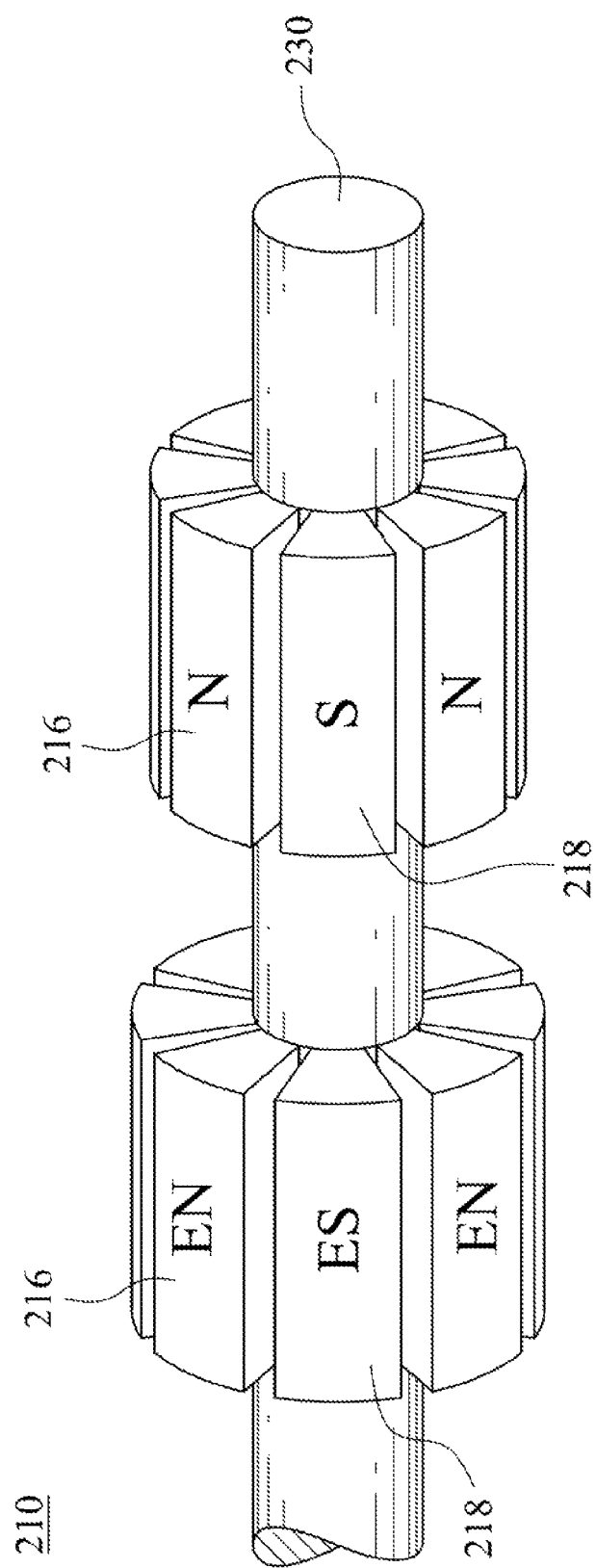
FIG. 3A is a lateral view of the rotor of FIG. 2.
Figure 3B:
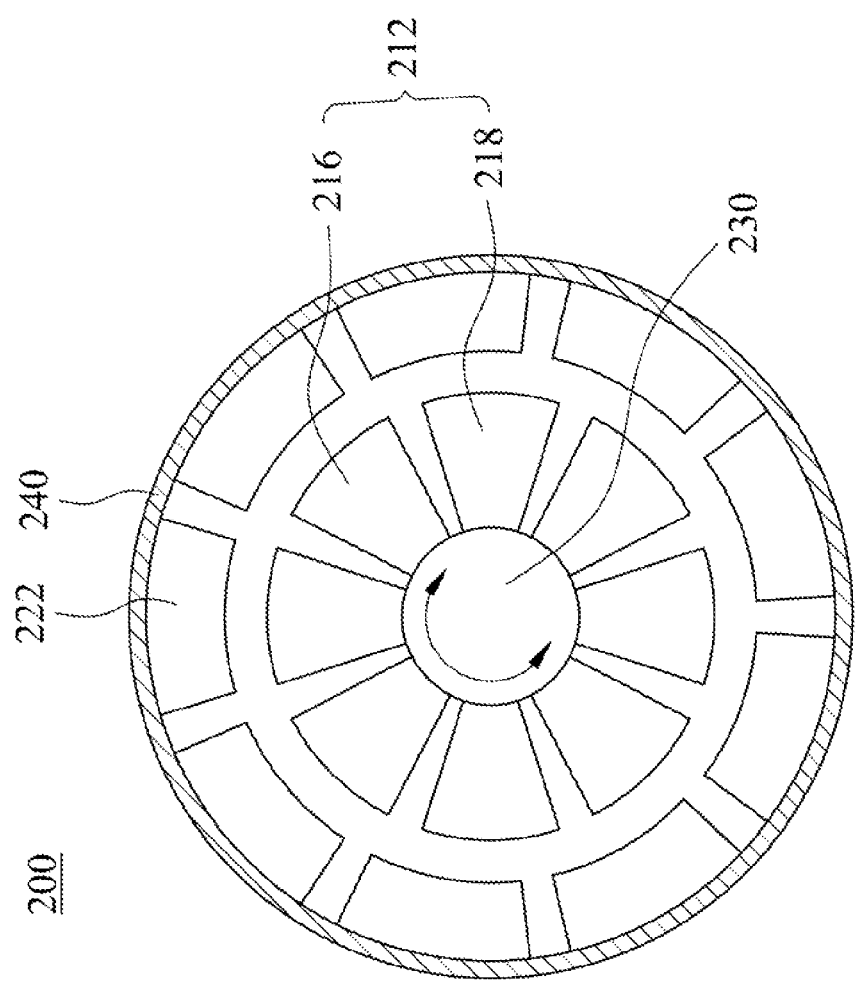
FIG. 3B is a cross-sectional view of the motor of FIG. 2.

FIG. 1 is a schematic view of a motor speed control system according to one embodiment of the present disclosure; FIG. 2 is a cross-sectional view of the motor of FIG. 1; FIG. 3A is a lateral view of the rotor of FIG. 2; and FIG. 3B is a cross-sectional view of the motor of FIG. 2. In FIG. 1, the motor speed control system 100 includes a motor 200, a control module 300, a displaying module 400 and a power supply 500.

In detail, the motor 200 includes a rotor 210, a stator 220, two slip rings 250 and a brush assembly 260. The rotor 210 includes a rotational axis 230, an induction rotor portion 212 and a permanent magnet rotor portion 214. The stator 220 includes a shell 240, an induction stator portion 222 and a permanent magnet stator portion 224. The stator 220 is located outside of the rotor 210. The induction rotor portion 212 is corresponding to the induction stator portion 222. The induction rotor portion 212 and the induction stator portion 222 are separated by an induction distance d1. The permanent magnet rotor portion 214 is corresponding to the permanent magnet stator portion 224. The permanent magnet rotor portion 214 and the permanent magnet stator portion 224 are separated by a permanent magnet distance d2. Moreover, the motor 200 has a motor current 270 that represents the amount of current consumed by the motor 200. The induction rotor portion 212 has an induction rotor current 272 that represents the amount of current consumed by the induction rotor portion 212. The induction stator portion 222 has an induction stator current 274 that represents the amount of current consumed by the induction stator ports 222. The permanent magnet stator portion 224 has a permanent magnet stator current 276 that represents the amount of current consumed by the permanent magnet stator portion 224. The motor current 270 is the sum of the induction rotor current 272, the induction stator current 274 and the permanent magnet stator current 276. The induction rotor portion 212, the induction stator portion 222 and the permanent magnet rotor portion 214 all have coils, and the induction rotor portion 212 and the induction stator portion 222 are used to provide a torque interaction by the coils to start the rotor 210 and generate a rotor speed. The permanent magnet rotor portion 214 is made of permanent magnetic material. Furthermore, the rotor 210 has a plurality of magnetic north poles 216 and a plurality of magnetic south poles 218, and each of the magnetic north poles 216 and each of the magnetic south poles 218 are interlaced with each other. The induction rotor portion 212 and the permanent magnet rotor portion 214 both have a plurality of magnetic north poles 216 and a plurality of magnetic south poles 218. The magnetic north poles 216 of the induction rotor portion 212 are corresponding to the magnetic north poles 216 of the permanent magnet rotor portion 214, respectively, so that they are mutually exclusive for reducing magnetic interference because of the same polarity.

In FIG. 2, the induction stator portion 222 of the stator 220 and the permanent magnet stator portion 224 of the stator 220 are fixedly connected to the inner wall of the shell 240, and the induction stator portion 222 and the permanent magnet stator portion 224 are located outside of the rotor 210. The shell 240 is pivotally connected to the rotational axis 230. The magnetic north poles 216 of the rotor 210 and the magnetic south poles 218 of the rotor 210 are alternately fixedly connected to the rotational axis 230. When the motor 200 is rotated, the rotor 210 is pivotally rotated relative to the stator 220, so that the rotational axis 230 is pivotally rotated relative to the shell 240. In other words, the rotor 210 is coaxially pivotally connected to the stator 220 by the rotational axis 230 and the shell 240. Moreover, the two slip rings 250 are both rotationally connected to the outside of the rotational axis 230 and electrically connected to the induction rotor portion 212 of the rotor 210. The brush assembly 260 is electrically connected to the control module 300 by a plurality of wires (not be shown). The brush assembly 260 includes two brushes 262 which are connected to the two slip rings 250 for conducting current, respectively. Furthermore, the shell 240 is a hollow cylinder, and the rotational axis 230 is cylindrical. The stator 220 is cylindrical because the stator 220 is fixedly connected to the inner wall of the shell 240. The rotor is also cylindrical because the rotor 210 is fixedly connected to the outer surface of the rotational axis 230. The rotational direction of the rotor 210 can be clockwise or counterclockwise. The induction rotor portion 212 and the permanent magnet rotor portion 214 are separated by an induction magnet distance d3, which not only can prevent magnetic interference between the induction rotor portion 212 and the permanent magnet rotor portion 214, but also can prevent magnetic interference between the induction stator portion 222 and the permanent magnet stator portion 224.

The control module 300 includes a first control member 310 and a second control member 320. The control module 300 is electrically connected to the rotor 210, the stator 220 and the brush assembly 260. The control module 300 controls the induction rotor current 272 of the induction rotor portion 212 and the induction stator current 274 of the induction stator portion 222 by the first control member 310, so that the rotor speed can be changed by the first control member 310 of the control module 300 when the rotor speed is lower than a predetermined value.

In one example, if the predetermined value represents a maximum rotor speed, while the rotor speed reaches a maximum value, the first control member 310 can decrease or turn off the induction rotor current 272 to weaken the magnetism of the rotor 210 and reduce the hysteresis effect of the motor 200, so that the rotor speed can be kept at the maximum value through a rotational inertia of the rotor 210 and the induced stator current 274, thereby saving the energy. When the rotor speed of the rotor 210 is kept at the predetermined value, the coils of the rotor 210 will form a closed loop owing to a short-circuit effect occurred. The coils of the rotor 210 still have an induced current produced from the induction stator current 274.

In another example, at the time that the rotor speed reaches the maximum value, the second control member 320 can be configured to control the permanent magnet stator current 276 (i.e. further increasing or decreasing the permanent magnet stator current 276). When the second control member 320 increases the permanent magnet stator current 276, the aforementioned maximum value of the rotor speed can be further increased. The first control member 310 or the second control member 320 can be a knob or a button.

The displaying module 400 includes a first display unit 410 and a second display unit 420. The displaying module 400 is electrically connected to the control module 300. The first display unit 410 displays the rotor speed. The second display unit 420 can display the motor current 270, the induction rotor current 272, the induction stator current 274 or the permanent magnet stator current 276. The rotor speed, the motor current 270, the induced rotor current 272, the induced stator current 274 or the permanent magnet stator current 276 will be variable during operation.

When a user adjust the first control member 310 or the second control member 320, the user can obtain the operation conditions and power consumption of the motor 200 from the displaying module 400.

The power supply 500 is electrically connected to the control module 300 and the displaying module 400. The power supply 500 provides a rotational power, a control power and a display power to the motor 200, the control module 300 and the displaying module 400 for operation, respectively. The rotational power is provided to the motor 200 for generating the motor current 270. Moreover, the rotational power will be converted into an induction power and a permanent magnet power by the control module 300, and the induction power is provided to the induction rotor portion 212 and the induction stator portion 222 for generating the induction rotor current 272 and the induction stator current 274, respectively. The permanent magnet power is provided to the permanent magnet stator portion 224 the permanent magnet stator current 276. In detail, the power supply 500 provides the rotational power to the motor 200 by the control module 300, so that the induction power of the rotational power is provided to the induction rotor portion 212 for generating the induction rotor current 272 according to the brush assembly 260 and the slip rings 250. The first control member 310 can decrease or turn off the induction rotor current 272 to weaken the magnetism of the rotor 210 during operation.

Figure 4A:
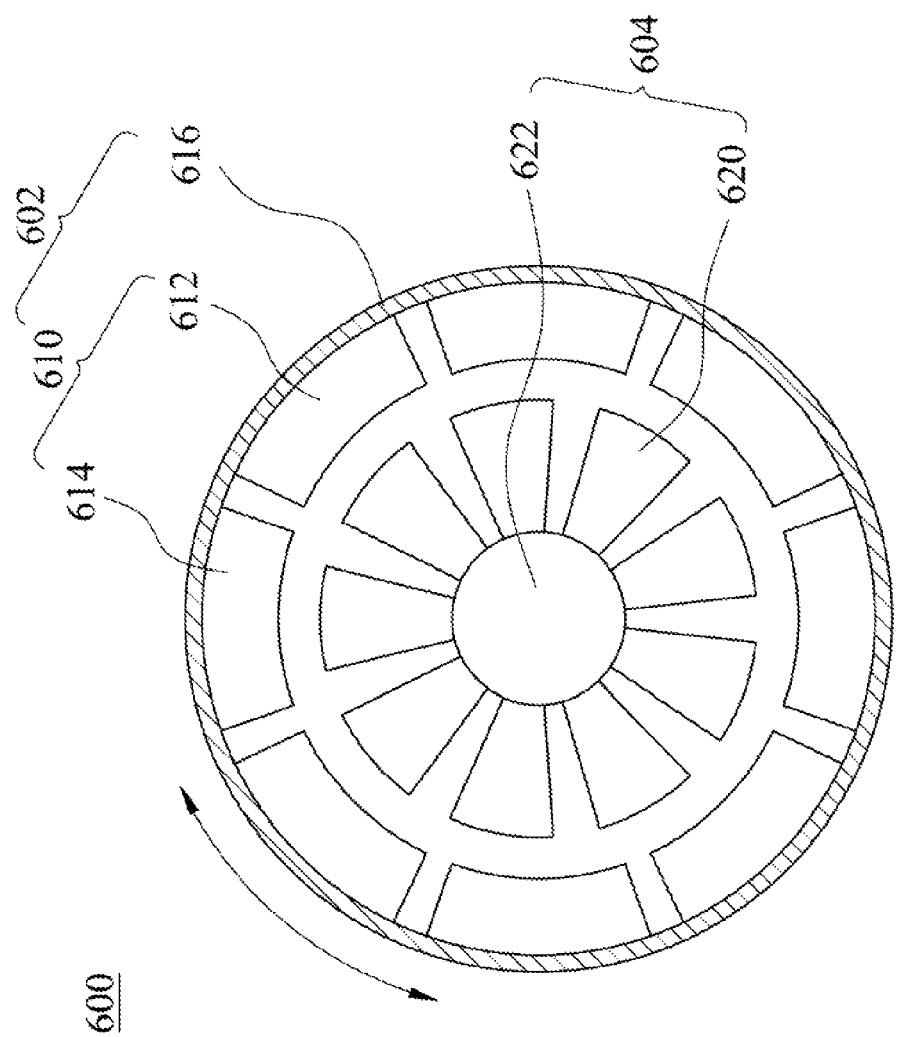
FIG. 4A is a cross-sectional view of a motor according to another embodiment of the present disclosure.

FIG. 4A is a cross-sectional view of the motor 600 according to another embodiment of the present disclosure. In FIG. 4A, the motor 600 includes a rotor 602 and a stator 604. The rotor 602 includes an induction rotor portion 610 and a shell 616, and the induction rotor portion 610 has a plurality of magnetic north poles 612 and a plurality of magnetic south poles 614. The stator 604 includes an induction stator portion 620 and a rotational axis 622. The rotor 602 is located outside of the stator 604. The magnetic north poles 612 of the induction rotor portion 610 and the magnetic south poles 614 of induction rotor portion 610 are alternately fixedly connected to the shell 616. The shell 616 is pivotally connected to the rotational axis 622. When the motor 600 is rotated, the rotor 602 is pivotally rotated relative to the stator 604 so that the shell 616 is pivotally rotated relative to the rotational axis 622. In other words, the rotor 602 is coaxially and pivotally connected to the stator 604 by the rotational axis 622 and the shell 616. In FIGS. 2 and 3B, it is showed that the rotor 210 is located inside of the stator 220, and the rotation of the rotor 210 is an internal rotation. In FIG. 4A, the rotor 602 is located outside of the stator 604, and the rotation of the rotor 602 is an external rotation. Therefore, the manufacturer can select a suitable motor according to different applications, such as the motor 200 or the motor 600.

FIG. 4B is a schematic view of the slip rings 252 according to another embodiment of the present disclosure. In FIGS. 4A and 4B, the slip rings 252 are rotationally connected to the outside of the shell 616, and the number of the slip rings 252 is two. The slip rings 252 are electrically connected to the induction rotor portion 610 of the rotor 602. The brush assembly 264 is electrically connected to the control module 300 by a plurality of wires and connected to the two slip rings 252 by two brushes 266. The slip rings 252 and the brush assembly 264 are both connected to the outside of the shell 616. When the rotation of the rotor 602 is the external rotation, the shell 616 is corresponding to the location of the induction rotor portion 610 for easily connecting with the slip rings 252 and the induction rotor portion 610. Therefore, this structure of the two slip rings 252, the two brushes 266 and the brush assembly 264 can significantly reduce manufacturing costs. In other words, the manufacturer can select a suitable structure according to different applications, such as the slip rings 250 or the slip rings 252.

Figure 5:
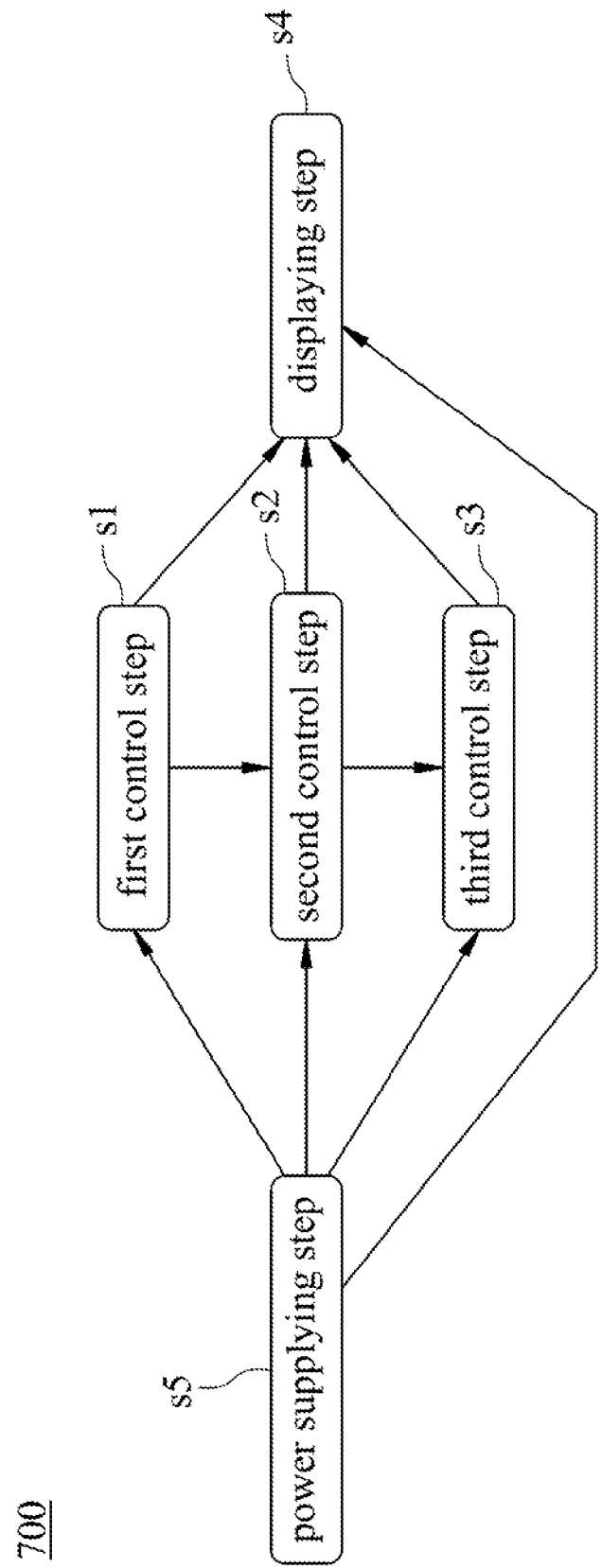
FIG. 5 is a flow chart of a motor speed control method according to one embodiment of the present disclosure.

FIG. 5 is a flow chart of a motor speed control method 700 according to one embodiment of the present disclosure. In FIG. 5, the motor speed control method 700 includes a first control step s1, a second control step s2, a third control step s3, a displaying step s4 and a power supplying step s5.

The first control step s1 is for controlling the induction rotor current 272 and the induction stator current 274 to change the rotor speed by the first control member 310 of the control module 300 when the rotor speed is less than the predetermined value.

The second control step s2 is for judging the rotor speed. When the rotor speed reaches the predetermined value, the second control step s2 is for decreasing or turning off the induction rotor current 272 by the first control member 310 of the control module 300, so that the rotor speed is kept at the predetermined value according to the rotational inertia of the rotor 210 and the induction stator current 274 of the induction stator portion 222. While the rotor speed reaches the predetermined value, the first control member 310 can decrease or turn off the induction rotor current 272 to weaken the magnetism of the rotor 210 and reduce the hysteresis effect of the motor 200, so that the rotor speed can be kept at the predetermined value for saving the energy. The coils of the rotor 210 will form a closed loop, that is, short-circuited condition, and the coils of the rotor 210 still have the induced current produced from the induction stator current 274.

The third control step s3 is for controlling the permanent magnet stator current 276 to increase the rotor speed by the second control member 320 of the control module 300 when the rotor speed reaches the predetermined value, so that the second control member 320 can increase the permanent magnet stator current 276 to further increase rotor speed over the predetermined value.

The displaying step s4 is for displaying the rotor speed, the motor current 270, the induction rotor current 272, the induction stator current 274 and the permanent magnet stator current 276 by the displaying, module 400. In detail, the first display unit 410 of the displaying module 400 displays the rotor speed. The second display unit 420 of the displaying module 400 can display the motor current 270, the induction rotor current 272, the induction stator current 274 or the permanent magnet stator current 276. The user can obtain the operation conditions and power consumption of the motor 200 from the displaying module 400.

The power supplying step s5 is utilizing a power supply 500 for providing a rotational power, a control power and a display power to the motor 200, the control module 300 and the displaying module 400, respectively. The rotational power is converted into an induction power and a permanent magnet power by the control module 300. The induction power is provided to the induction rotor portion 212 and the induction stator portion 222 for generating the induction rotor current 272 and the induction stator current 274, respectively. Furthermore, the permanent magnet power is provided to the permanent magnet stator portion 224 for generating the permanent magnet stator current 276. The power supplying step s5 effectively provides stable power in the process of the first control step s1, the second control step s2, the third control step s3 and the displaying step s4.

According to the aforementioned embodiments and examples, the advantages of the present disclosure are described as follows.

1. The system and method of the present disclosure can reduce the thermal demagnetization under high load by substituting the permanent magnet by the induction.

2. The system and method of the present disclosure can retain the maximum torque of the motor by increasing the induction rotor current when the rotor speed is less than the predetermined value.

3. The system and method of the present disclosure can weaken the magnetism of the rotor and reduce the hysteresis effect of the motor for saving the energy. Moreover, the system and method of the present disclosure can further increase rotor speed over the predetermined value by the control module.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A motor speed control system, comprising:
   a motor, comprising:
      a rotor comprising at least one induction rotor portion and at least one permanent magnet rotor portion;
      and a stator coaxially and pivotally connected to the rotor, the stator comprising at least one induction stator portion and at least one permanent magnet stator portion, wherein the induction rotor portion is corresponding to the induction stator portion, the induction rotor portion and the induction stator portion are separated by an induction distance, the permanent magnet rotor portion is corresponding to the permanent magnet stator portion, and the permanent magnet rotor portion and the permanent magnet stator portion are separated by a permanent magnet distance;
   a control module electrically connected to the rotor and the stator and operable by a user, wherein the control module controls an induction rotor current of the induction rotor portion, an induction stator current of the induction stator portion and a permanent magnet stator current of the permanent magnet stator portion to produce a rotor speed, and the control module decreases or turns off the induction rotor current to keep the rotor speed at a predetermined value according to a rotational inertia of the rotor and the induction stator current when the rotor speed reaches the predetermined value;
   and a displaying module electrically connected to the control module, wherein the displaying module displays the rotor speed, the induction rotor current and the permanent magnet stator current;
   wherein the control module comprises a first control member adjusted by the user and configured to control the induction rotor current and the induction stator current, and a second control member adjusted by the user and configured to control the permanent magnet stator current;
   wherein when the rotor speed reaches the predetermined value the first control member decreases or turns off the induction rotor current, and the second control member at the same time increases the permanent magnet stator current to increase the rotor speed.

2. The motor speed control system of claim 1, further comprising:
   a power supply electrically connected to the control module and the displaying module, wherein the power supply provides a rotational power to the control module, the rotational power is converted into an induction power and a permanent magnet power by the control module, the induction power is provided to the induction rotor portion for generating the induction rotor current, the induction power is provided to the induction stator portion for generating the induction stator current, the permanent magnet power is provided to the permanent magnet stator portion for generating the permanent magnet stator current, the power supply provides a control power to the control module, and the power supply provides a display power to the displaying module.

3. The motor speed control system of claim 1, wherein the rotor further comprises a plurality of magnetic north poles and a plurality of magnetic south poles, each of the magnetic north poles and each of the magnetic south poles are interlaced with each other, and the rotor and the stator are cylindrical.

4. The motor speed control system of claim 1, wherein the motor further comprises two slip rings and a brush assembly, the rotor further comprises a rotational axis, the two slip rings are connected to the rotational axis and electrically connected to the induction rotor portion, the brush assembly is electrically connected to the control module, the brush assembly comprises two brushes, and the two brushes are connected to the two slip rings, respectively.

5. A motor speed control method for using the motor speed control system of claim 1, comprising:
   a first control step, wherein the first control step is for controlling the induction rotor current and the induction stator current to change the rotor speed by the control module when the rotor speed is less than the predetermined value;
   a second control step, wherein the second control step is for decreasing or turning off the induction rotor current by the control module when the rotor speed reaches the predetermined value, and the rotor speed is kept at the predetermined value according to the rotational inertia of the rotor and the induction stator current;
   a third control step, wherein the third control step is for controlling the permanent magnet stator current to increase the rotor speed by the control module when the rotor speed reaches the predetermined value;
   and a displaying step, wherein the displaying step is for displaying the rotor speed, the induction rotor current and the permanent magnet stator current by the displaying module;
   wherein the control module comprises a first control member adjusted by a user and configured to control the induction rotor current and the induction stator current, and a second control member adjusted by the user and configured to control the permanent magnet stator current;

wherein when the rotor speed reaches the predetermined value the first control member decreases or turns off the induction rotor current, and the second control member at the same time increases the permanent magnet stator current to increase the rotor speed.

6. The motor speed control method of claim 5, further comprising:

a power supplying step, wherein the power supplying step is utilizing a power supply for providing a rotational power, a control power and a display power to the motor, the control module and the displaying module, respectively, the rotational power is converted into an induction power and a permanent magnet power by the control module, the induction power is provided to the induction rotor portion and the induction stator portion for generating the induction rotor current and the induction stator current, respectively, and the permanent magnet power is provided to the permanent magnet stator portion for generating the permanent magnet stator current.

* * * * *